(12) United States Patent
Hung

(10) Patent No.: US 7,582,038 B2
(45) Date of Patent: Sep. 1, 2009

(54) DIFFERENTIAL GEAR TRAIN FOR WHEELED VEHICLE

(75) Inventor: Mu-Chen Hung, Kaohsiung Hsien (TW)

(73) Assignee: Taiwan Gloden Bee Co., Ltd., Kaohsiung Hsien (TW)

( * ) Notice: Subject to any disclaimer, the term of this patent is extended or adjusted under 35 U.S.C. 154(b) by 315 days.

(21) Appl. No.: 11/638,170

(22) Filed: Dec. 13, 2006

(65) Prior Publication Data

US 2008/0146400 A1    Jun. 19, 2008

(51) Int. Cl.
*F16H 48/10* (2006.01)
(52) U.S. Cl. ................................................ 475/252
(58) Field of Classification Search ................ 475/249, 475/252
See application file for complete search history.

(56) References Cited

U.S. PATENT DOCUMENTS 5,749,803 A * 5/1998 Teraoka et al. .............. 475/249
6,402,656 B1 * 6/2002 Peralta ........................ 475/252

* cited by examiner

*Primary Examiner*—Sherry L Estremsky
*Assistant Examiner*—Erin D Bishop
(74) *Attorney, Agent, or Firm*—Alan Kamrath; Kamrath & Associates PA

(57) ABSTRACT

A differential gear train for a wheeled vehicle includes a first housing, a first cover, a second housing, a second cover, a plurality of pinions, a first sun gear, and a second sun gear. Thus, the first sun gear drives the second sun gear by provision of the pinions at different positions so that the second propeller shaft in the second sun gear is directly driven by the first propeller shaft in the first sun gear by transmission of the first sun gear, the second sun gear and the pinions to perform a direct transmission exactly without incurring deflection, thereby enhancing the precision of transmission.

15 Claims, 6 Drawing Sheets

DIFFERENTIAL GEAR TRAIN FOR WHEELED VEHICLE

BACKGROUND OF THE INVENTION

1. Field of the Invention

The present invention relates to a differential gear train and, more particularly, to a differential gear train for a wheeled vehicle.

2. Description of the Related Art

A differential gear train is used to drive the tires of a wheeled vehicle to turn rightward or leftward. A conventional differential gear train 1 for a wheeled vehicle in accordance with the prior art shown in FIG. 6 comprises two housings 10 combined together, a driving gear 11 mounted between the housings 10, a bevel drive gear 13 pivotally mounted on an end face of the driving gear 11, a hollow shell 14 locked onto the driving gear 11, a support shaft 12 extended through the housings 10 to fix the bevel drive gear 13, another support shaft 12 extended through the housings 10 and the shell 14 to fix another bevel drive gear 13, an axle 15 mounted in the shell 14 and located between the two bevel drive gears 13, and two bevel differential gears 16 pivotally mounted on the axle 15 and intermeshing with the two bevel drive gears 13 in a staggered manner. Thus, the axle 15 is used to support the two bevel differential gears 16, and the support shafts 12 are used to support the two bevel drive gears 13.

However, the axle 15 and the support shafts 12 are not connected directly, so that the two bevel differential gears 16 and the two bevel drive gears 13 easily produce a fit deflection therebetween, thereby decreasing the precision of transmission. In addition, the two bevel differential gears 16 and the two bevel drive gears 13 easily produce a slip during transmission.

BRIEF SUMMARY OF THE INVENTION

In accordance with the present invention, there is provided a differential gear train, comprising a first housing, a first cover mounted on a first end face of the first housing, a second housing having a first end face mounted on a second end face of the first housing, a second cover mounted on a second end face of the second housing, a plurality of pinions mounted in the first housing and intermeshing with each other, a first sun gear mounted radially inner of the first housing and the first cover and meshing with respective some of the pinions to rotate the respective pinions, and a second sun gear mounted between the second housing and the second cover and meshing with and rotated by respective some of the pinions.

The primary objective of the present invention is to provide a differential gear train for a wheeled vehicle, wherein the first sun gear drives the second sun gear by provision of the pinions at different positions of the pivot shafts so that the second propeller shaft is directly driven by the first propeller shaft by transmission of the first sun gear, the second sun gear and the pinions to perform a direct transmission exactly without incurring deflection, thereby enhancing the precision of transmission.

Another objective of the present invention is to provide a differential gear train for a wheeled vehicle, wherein the first sun gear is provided with a plurality of first friction washers, a first flat washer and a first spring washer to prevent occurrence of a slip, so that the first sun gear is operated solidly and stably so as to enhance the stability of transmission.

A further objective of the present invention is to provide a differential gear train for a wheeled vehicle, wherein the second sun gear is provided with a plurality of second friction washers, a second flat washer and a second spring washer to prevent occurrence of a slip, so that the second sun gear is operated solidly and stably so as to enhance the stability of transmission.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
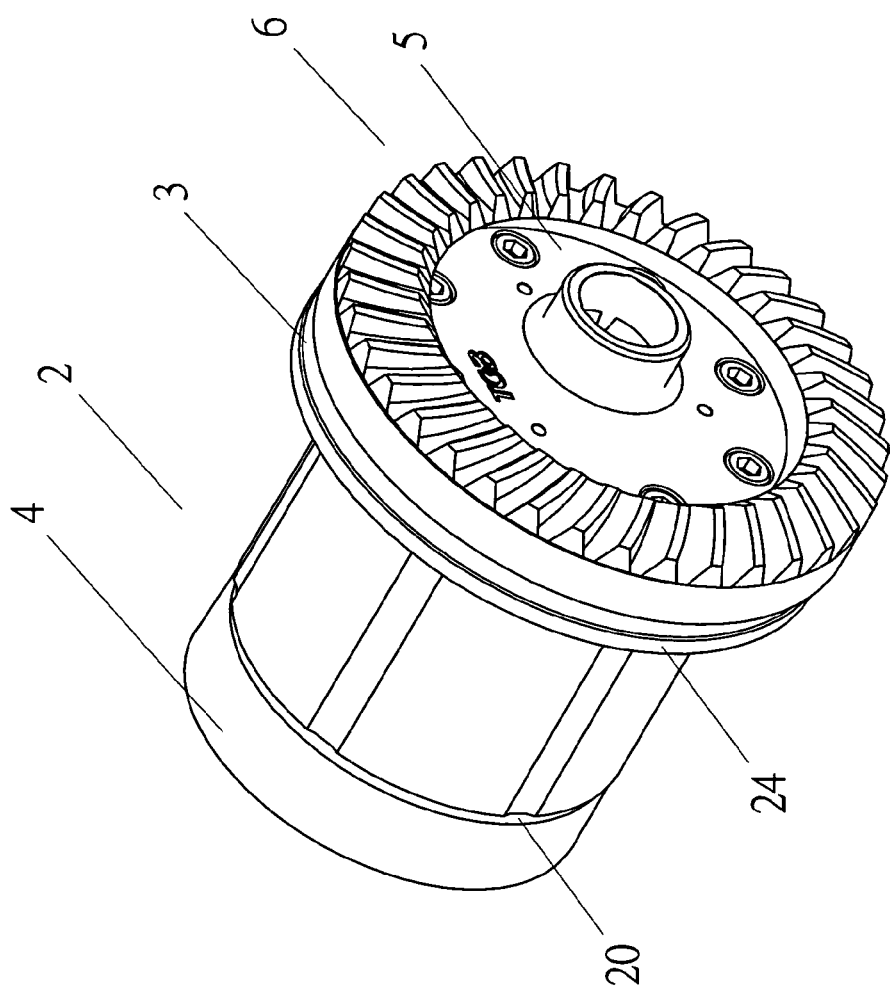
FIG. 1 is a perspective view of a differential gear train in accordance with the preferred embodiment of the present invention.
Figure 2:
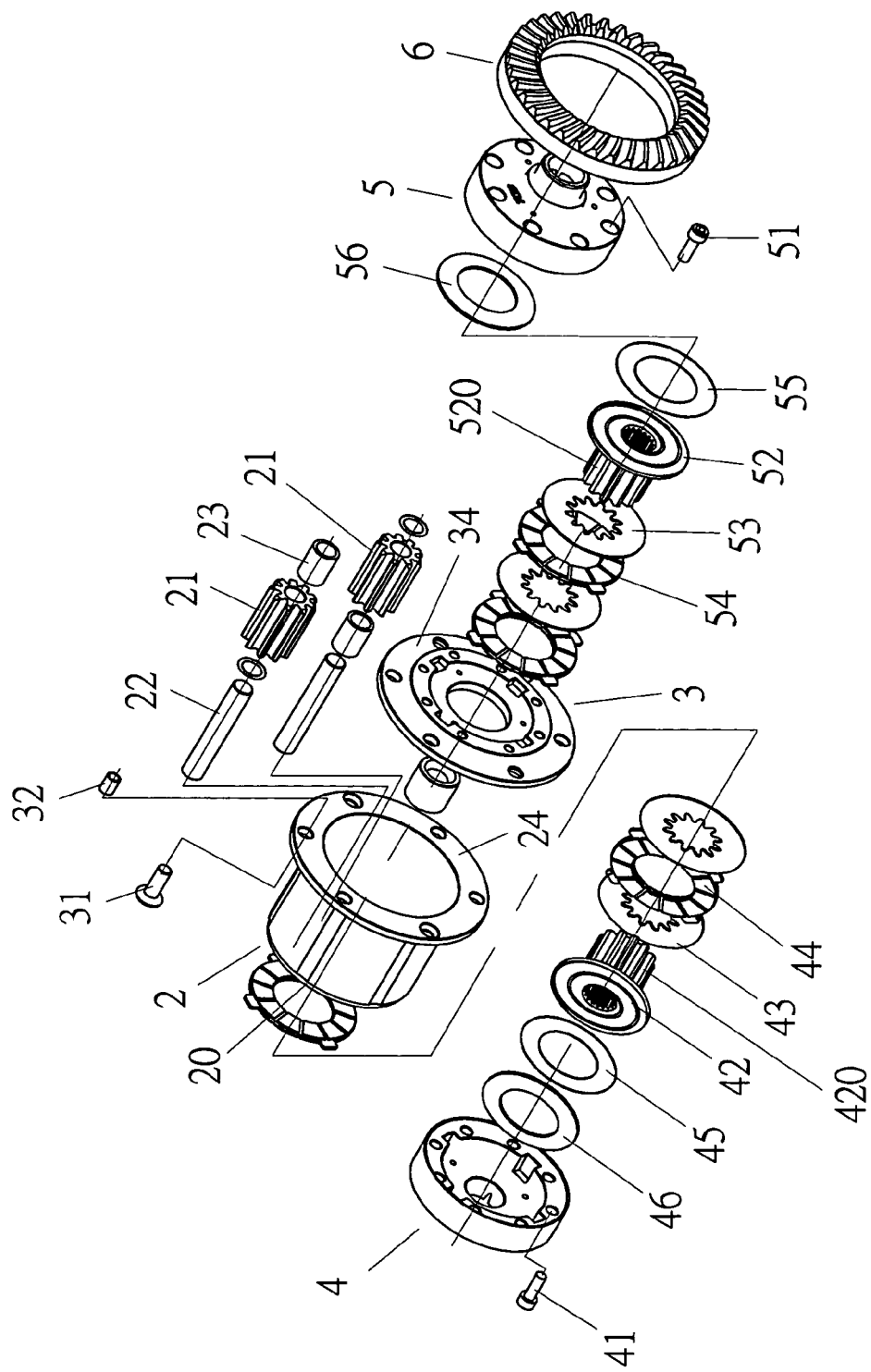
FIG. 2 is an exploded perspective view of the differential gear train as shown in FIG. 1.
Figure 3:
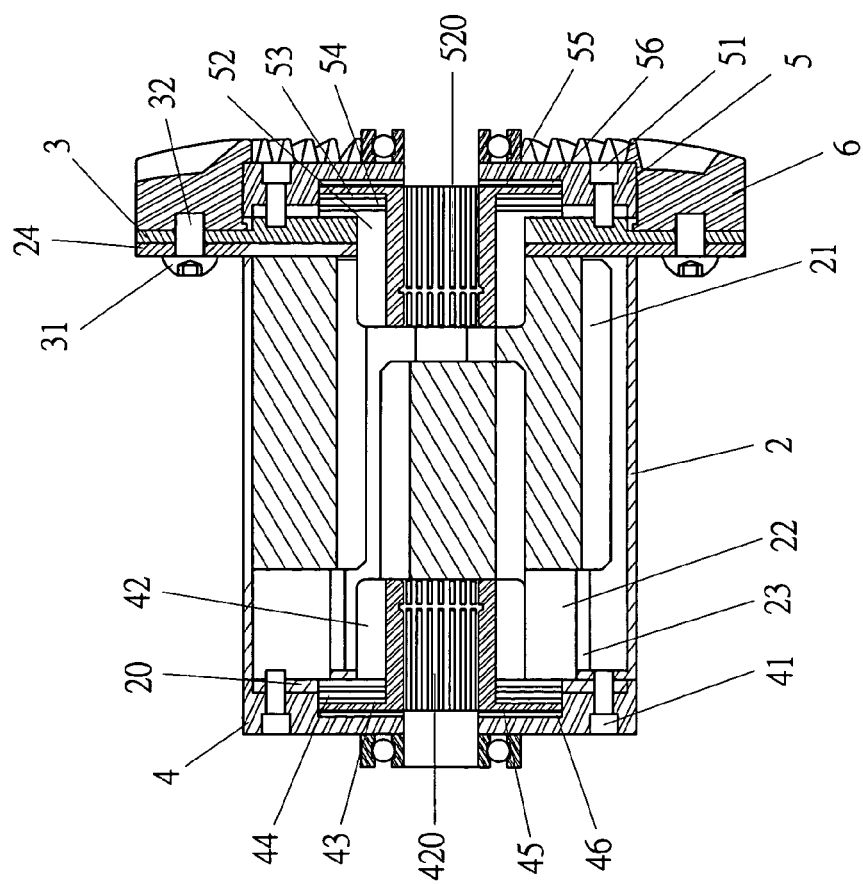
FIG. 3 is a front cross-sectional view of the differential gear train as shown in FIG. 1.

Referring to the drawings and initially to FIGS. 1-3, a differential gear train for a wheeled vehicle in accordance with the preferred embodiment of the present invention comprises a first housing 2, a first cover 4 mounted on a first end face 20 of the first housing 2, a second housing 3 having a first end face mounted on a second end face 24 of the first housing 2, a second cover 5 mounted on a second end face 34 of the second housing 3, a disk-shaped gear 6 mounted on the second end face 34 of the second housing 3 and enclosed around the second cover 5, a plurality of pinions 21 mounted in the first housing 2 and intermeshing with each other, a first sun gear 42 mounted radially inner of the first housing 2 and the first cover 4 and meshing with respective some of the pinions 21 to rotate the respective pinions 21, and a second sun gear 52 mounted between the second housing 3 and the second cover 5 and meshing with and rotated by respective some of the pinions 21.

Figure 4:
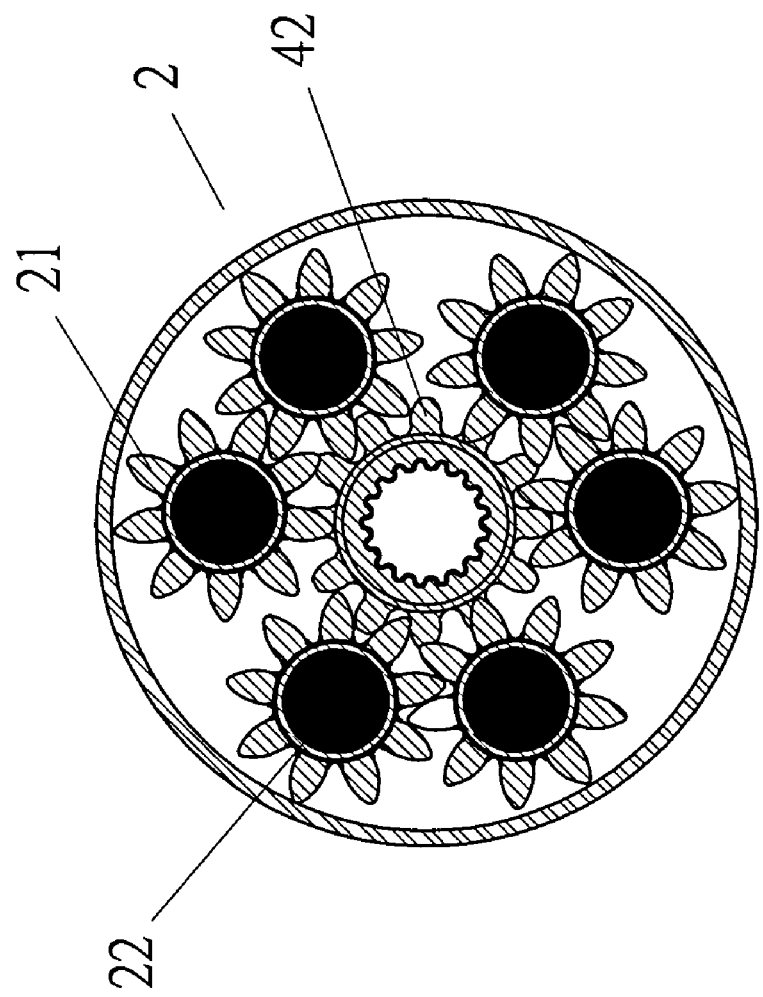
FIG. 4 is a side cross-sectional view of the differential gear train as shown in FIG. 1.
Figure 5:
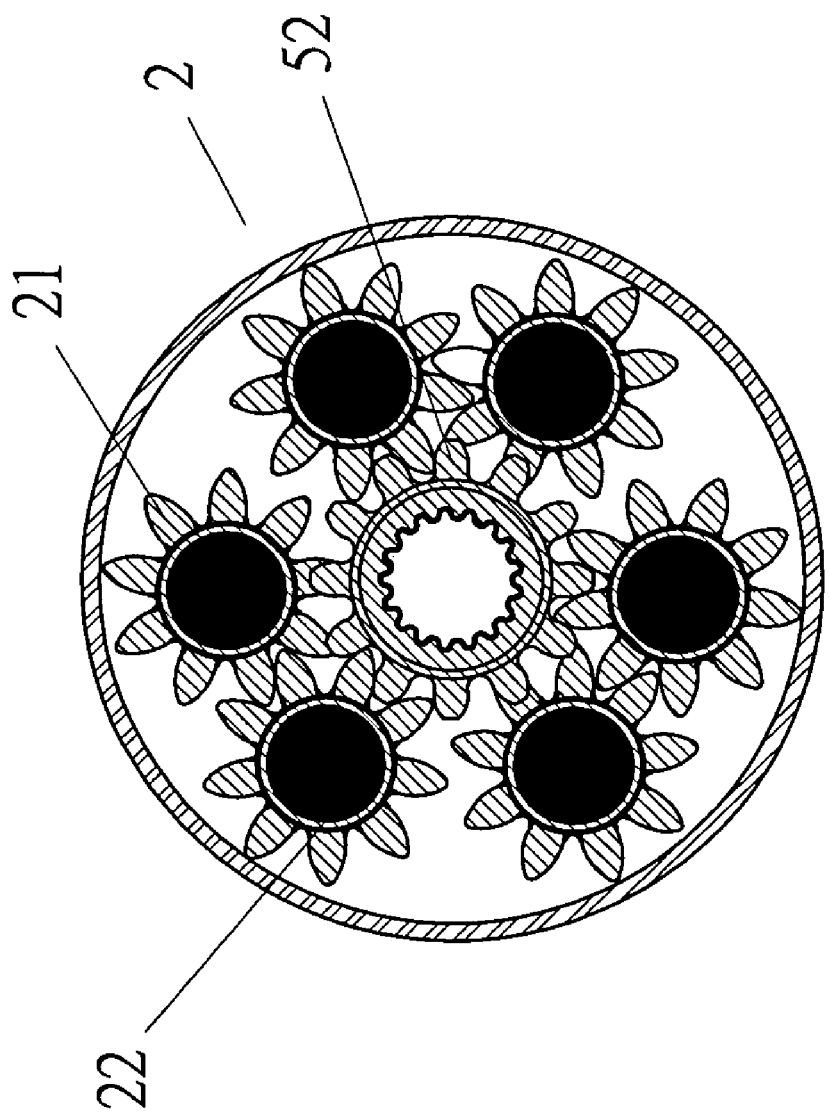
FIG. 5 is another side cross-sectional view of the differential gear train as shown in FIG. 1.
Figure 6:
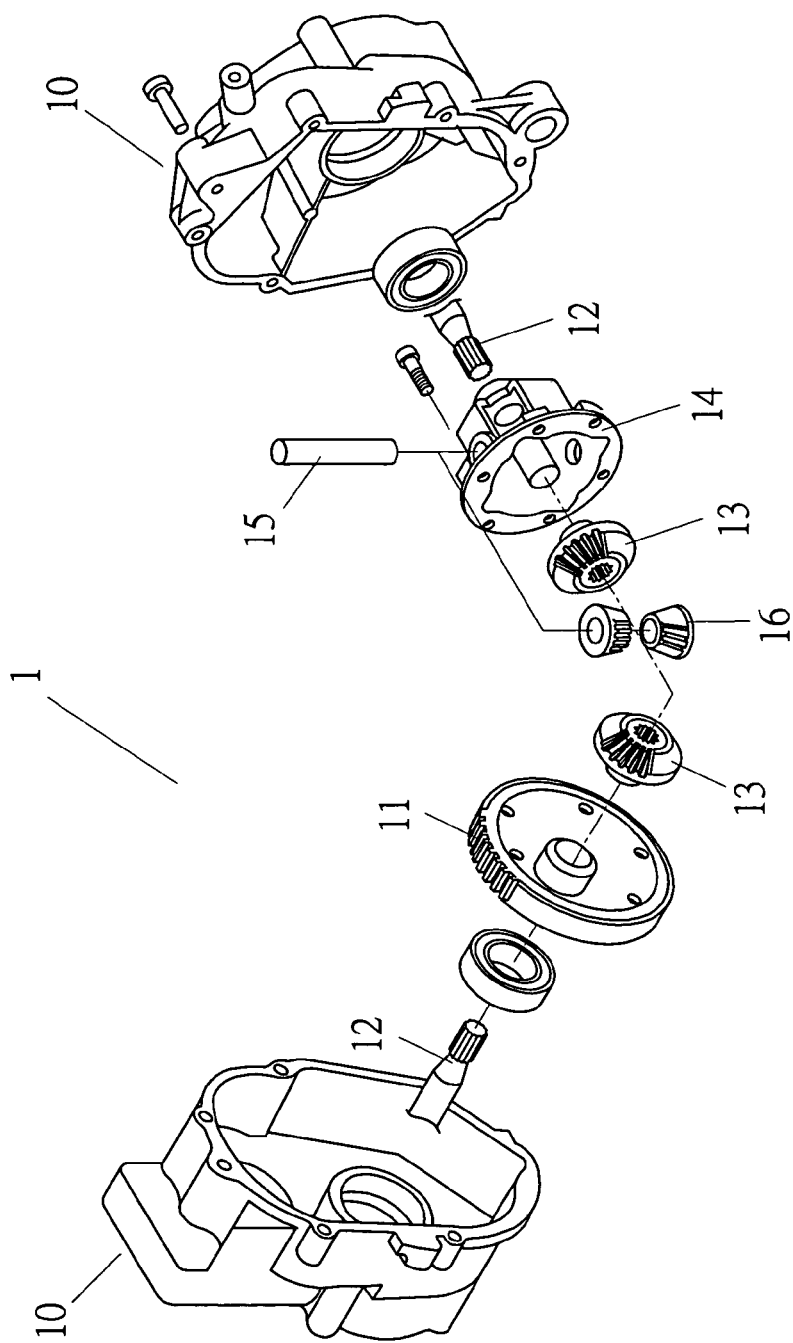
FIG. 6 is an exploded perspective view of a conventional differential gear train in accordance with the prior art.

The pinions 21 are arranged in the first housing 2 in an annular shape, the first sun gear 42 is located between and enclosed by the respective pinions 21, and the second sun gear 52 is located between and enclosed by the respective pinions 21 as shown in FIGS. 4 and 5. Each of the pinions 21 is mounted on a pivot shaft 22 which is mounted on the first end face 20 of the first housing 2. The pinions 21 on the pivot shafts 22 are located at different horizontal positions by spacing of a plurality of spacers 23 which are located at different horizontal positions of the pivot shafts 22 to change the horizontal positions of the pinions 21 on the pivot shafts 22. Thus, the pinions 21 are disposed at different leftward and rightward positions of the pivot shafts 22 in a staggered manner as shown in FIGS. 2 and 3.

The first cover 4 is fixed on the first end face 20 of the first housing 2 by a plurality of locking screws 41. The second end face 24 of the first housing 2, the second housing 3 and the disk-shaped gear 6 are combined together by a plurality of positioning screws 31 and a plurality of positioning pins 32. The second cover 5 is fixed on the second end face 34 of the second housing 3 by a plurality of fastening screws 51.

The differential gear train further comprises a plurality of first friction washers 43 and 44 having different shapes mounted between the first housing 2 and the first sun gear 42, a first flat washer 45 and a first spring washer 46 mounted between the first sun gear 42 and the first cover 4, a plurality of second friction washers 53 and 54 having different shapes mounted between the second housing 3 and the second sun gear 52, and a second flat washer 55 and a second spring washer 56 mounted between the second sun gear 52 and the second cover 5.

The first sun gear 42 has a side formed with a protruding first toothed axle 420 extended through the first end face 20 of the first housing 2 into an inside of the first housing 2, and the first friction washers 43 and 44 are mounted on the first toothed axle 420 of the first sun gear 42.

The second sun gear 52 has a side formed with a protruding second toothed axle 520 extended through the second housing 3 into the inside of the first housing 2, and the second friction washers 53 and 54 are mounted on the second toothed axle 520 of the second sun gear 52.

In assembly, the pinions 21 intermesh with each other, the first sun gear 42 is located at a leftward side of the first housing 2 and meshes with the respective pinions 21 at the leftward positions of the pivot shafts 22, and the second sun gear 52 is located at a rightward side of the first housing 2 and meshes with the respective pinions 21 at the rightward positions of the pivot shafts 22 as shown in FIGS. 2 and 3. Then, a first propeller shaft (not shown) is extended through the first sun gear 42 to drive the first sun gear 42, and a second propeller shaft (not shown) is extended through the second sun gear 52 to be driven by the second sun gear 52.

In operation, referring to FIGS. 1-5, the first propeller shaft drives the first sun gear 42 which rotates the respective pinions 21 at the leftward positions of the pivot shafts 22 to rotate the respective pinions 21 at the rightward positions of the pivot shafts 22 to rotate the second sun gear 52 which drives the second propeller shaft to rotate so as to achieve a differential transmission purpose.

Accordingly, the first sun gear 42 drives the second sun gear 52 by provision of the pinions 21 at different positions of the pivot shafts 22 so that the second propeller shaft is directly driven by the first propeller shaft by transmission of the first sun gear 42, the second sun gear 52 and the pinions 21 so as to perform a direct transmission exactly without incurring deflection, thereby enhancing the precision of transmission. In addition, the first sun gear 42 is provided with a plurality of first friction washers 43 and 44, a first flat washer 45 and a first spring washer 46 to prevent occurrence of a slip, so that the first sun gear 42 is operated solidly and stably so as to enhance the stability of transmission. Further, the second sun gear 52 is provided with a plurality of second friction washers 53 and 54, a second flat washer 55 and a second spring washer 56 to prevent occurrence of a slip, so that the second sun gear 52 is operated solidly and stably so as to enhance the stability of transmission.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A differential gear train, comprising:
   a first housing;
   a first cover mounted on a first end face of the first housing;
   a second housing having a first end face mounted on a second end face of the first housing;
   a second cover mounted on a second end face of the second housing;
   a plurality of pinions mounted in the first housing and intermeshing with each other;
   a first sun gear mounted radially inner of the first housing and the first cover and meshing with respective some of the pinions to rotate the respective pinions;
   a second sun gear mounted between the second housing and the second cover and meshing with and rotated by respective some of the pinions;
   a plurality of first friction washers having different shapes mounted between the first housing and the first sun gear;
   a first flat washer and a first spring washer mounted between the first sun gear and the first cover;
   a plurality of second friction washers having different shapes mounted between the second housing and the second sun gear;
   a second flat washer and a second spring washer mounted between the second sun gear and the second cover.

2. The differential gear train in accordance with claim 1, wherein the pinions are arranged in the first housing in an annular shape.

3. The differential gear train in accordance with claim 1, wherein the first sun gear is located between and enclosed by the respective pinions.

4. The differential gear train in accordance with claim 1, wherein the second sun gear is located between and enclosed by the respective pinions.

5. The differential gear train in accordance with claim 1, wherein each of the pinions is mounted on a pivot shaft which is mounted on the first end face of the first housing.

6. The differential gear train in accordance with claim 5, wherein the pinions on the pivot shafts are located at different horizontal positions by spacing of a plurality of spacers which are located at different horizontal positions of the pivot shafts to change the horizontal positions of the pinions on the pivot shafts.

7. The differential gear train in accordance with claim 6, wherein the pinions are disposed at different leftward and rightward positions of the pivot shafts in a staggered manner.

8. The differential gear train in accordance with claim 7, wherein the first sun gear is located at a leftward side of the first housing and meshes with the respective pinions at the leftward positions of the pivot shafts, and the second sun gear is located at a rightward side of the first housing and meshes with the respective pinions at the rightward positions of the pivot shafts.

9. The differential gear train in accordance with claim 8, wherein the first sun gear rotates the respective pinions at the leftward positions of the pivot shafts to rotate the respective pinions at the rightward positions of the pivot shafts to rotate the second sun gear.

10. The differential gear train in accordance with claim 1, wherein the first sun gear has a side formed with a protruding first toothed axle extended through the first end face of the first housing into an inside of the first housing, and the first friction washers are mounted on the first toothed axle of the first sun gear.

11. The differential gear train in accordance with claim 1, wherein the second sun gear has a side formed with a protruding second toothed axle extended through the second housing into an inside of the first housing, and the second friction washers are mounted on the second toothed axle of the second sun gear.

12. The differential gear train in accordance with claim 1, wherein the first cover is fixed on the first end face of the first housing by a plurality of locking screws.

13. The differential gear train in accordance with claim 1, wherein the second cover is fixed on the second end face of the second housing by a plurality of fastening screws.

14. A differential gear train, comprising:
 a first housing;
 a first cover mounted on a first end face of the first housing;
 a second housing having a first end face mounted on a second end face of the first housing;
 a second cover mounted on a second end face of the second housing;
 a plurality of pinions mounted in the first housing and intermeshing with each other;
 a first sun gear mounted radially inner of the first housing and the first cover and meshing with respective some of the pinions to rotate the respective pinions;
 a second sun gear mounted between the second housing and the second cover and meshing with and rotated by respective some of the pinions;
 a disk-shaped gear mounted on the second end face of the second housing and enclosed around the second cover.

15. The differential gear train in accordance with claim 14, wherein the second end face of the first housing, the second housing and the disk-shaped gear are combined together by a plurality of positioning screws and a plurality of positioning pins.

* * * * *